March 9, 1937. A. J. TROTT 2,073,541
VALVE
Filed Sept. 14, 1934
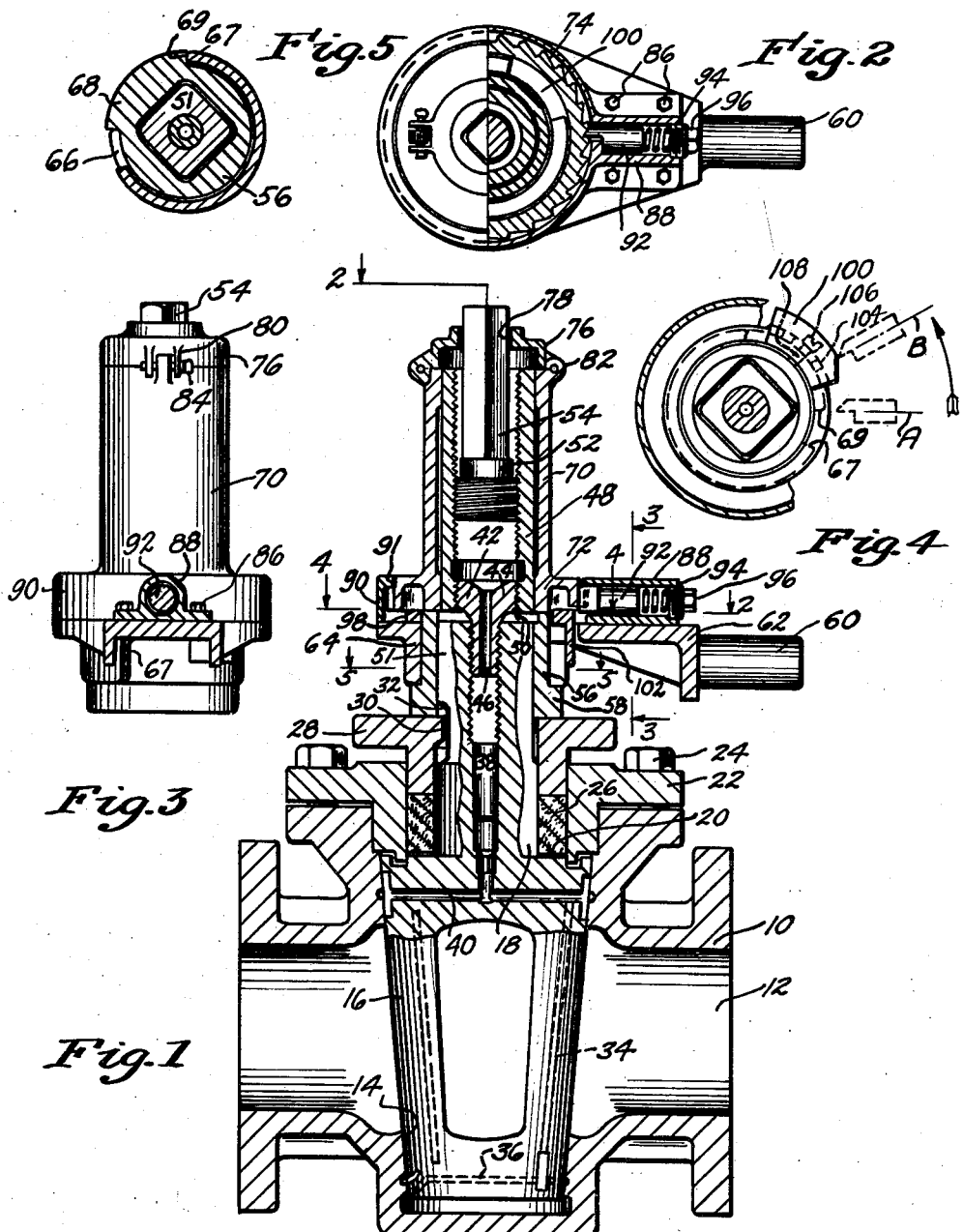
INVENTOR.
Arthur J. Trott
BY
Albert J. Henderson
ATTORNEY.

Patented Mar. 9, 1937

2,073,541

UNITED STATES PATENT OFFICE 2,073,541

VALVE

Arthur J. Trott, Greensburg, Pa., assignor to Walworth Patents Inc., Boston, Mass., a corporation of Massachusetts Application September 14, 1934, Serial No. 744,035

11 Claims. (Cl. 251—93)

This invention relates to lubricated valves and more particularly to lubricating means therefor.

One object of the invention is to lubricate a valve by actuation of the valve operating means.

Another object of the invention is to permit a predetermined amount of lubricant to be forced to the valve seat before the valve is operated.

Another object of the invention is to provide for additional lubrication in any desired position of the valve member.

Another object of the invention is to provide a lubricating device which will be applicable to existing valves without substantial alteration thereof.

Another object of the invention is to increase the lubricant reservoir capacity of standard lubricated valves.

Another object of the invention is to provide a simple and economical means whereby the use of separate tools for operating and lubricating the valve is eliminated.

Other objects and advantages will become apparent from the following description taken in connection with the accompanying drawing wherein:—

Fig. 1 is a longitudinal sectional view of a lubricated valve embodying the invention and showing the valve in full closed position.

Fig. 2 is a section taken on the line 2—2 of Fig. 1 looking in the direction indicated by the arrows.

Fig. 3 is a section taken on the line 3—3 of Fig. 1 looking in the direction indicated by the arrows.

Fig. 4 is a section taken on the line 4—4 of Fig. 1 looking in the direction indicated by the arrows.

Fig. 5 is a section taken on the line 5—5 of Fig. 1 looking in the direction indicated by the arrows, but showing position of the parts when the valve is in full open position.

Referring more particularly to the drawing, the subject matter of the invention is shown in Fig. 1 as applied to a conventional lubricated plug valve having a body 10 provided with a longitudinal passageway 12 and a transverse, tapered bore 14 forming a seating surface for a tapered valve member 16. The valve member 16 is reduced at one end to form a stem 18 defining a shoulder 20. In order to retain the valve member 16 to its seat, an annular retaining plate 22 is secured by means of the bolts 24 to the casing overlying the shoulder 20. The annular valve retaining member 22 is preferably spaced from the stem 18 a sufficient distance to provide a stuffing box within which a packing 26 is adapted to be retained by a packing gland 28. The packing gland 28 is preferably provided with a lug 30 which projects into an arcuate recess 32 formed in the valve stem 18, and of sufficient length to permit a 90° rotation of the valve member 16 before further movement is limited by the lug 30 engaging an end wall of the recess.

Lubricant is distributed to the seating surface of the valve member and its seat by a system of lubricant grooves including longitudinal grooves 34 and circumferential grooves 36 formed in the seating surface of the valve member and seat. These grooves receive lubricant from a reservoir 38 extending axially of the valve stem and communicating with a transverse outlet 40 leading to said grooves.

The lubricant reservoir 38 is threaded for a portion of its length and ordinarily a compressor screw (not shown) is reciprocated in the threaded portion of the reservoir to force lubricant to the valve seat. In this instance, however, an adaptor 42 is inserted in the threaded portion of the reservoir. This adaptor 42 is provided with an enlarged threaded head 44 and an axial bore 46 for a purpose to be described later.

In accordance with this invention novel means are provided for forcing lubricant to the valve seat and, to this end, an auxiliary reservoir 48 is formed by a cylindrical member having a bore provided, in this instance, with right-handed threads mounted on the threaded head 44 of the adaptor 42. In order to prevent undesired turning of the cylindrical member with respect to the adaptor 42, these members may be welded together as at 50. Reciprocably mounted within the reservoir 48 is a compressor screw 52 having, in this instance, right-handed threads and having a reduced stem 54 preferably of polygonal form and of sufficient length to project from the reservoir 48 when the screw is bottomed therein. The reservoir 48 is adapted to contain lubricant which may be forced to the valve seat by operation of the compressor 52 as will be apparent.

The end 51 of the valve stem adjacent the adaptor 42 is preferably of polygonal form to receive a suitably apertured collar 56 supported upon the packing gland 28. The collar 56 is formed with an enlarged head 58 defining a shoulder upon which the operating member for the valve is supported.

The operating member in this instance comprises a cylindrical handle portion 60 adapted to receive a pipe or similar tool to increase the leverage. Extending from the handle 60 is an integral angle portion 62 terminating in an annular portion 64 rotatable upon the collar 56.

The annular portion 64 is provided with a slot 66 adapted to receive a projection 68 extending from the collar 56. In this manner rotary movement of the operating member is transmitted to the collar 56. Preferably the projection 68 as shown in Fig. 5 is, in cross-section, in the form of a quadrant while slot 66 is sufficiently larger to provide for a limited period of movement of the operating member before the collar 56 will be moved by engagement of one of the walls 67 of the slot 66 with the adjacent wall 69 of the projection as will be described hereinafter.

Surrounding the reservoir member 48 and rotatable thereon is a sleeve 70 terminating at one end in an enlarged head 72 provided with a toothed periphery constituting a ratchet wheel 74. Mounted on the other end of the sleeve 70 is a cap portion 76 having a polygonal bore 78 adapted to engage the polygonal portion 54 of the compressor 52. The cap portion 76 is detachably secured to the sleeve 70 by the provision of oppositely disposed bi-furcated lugs 80 thereon which cooperate with oppositely disposed lugs 82 formed on the sleeve 70, the lugs 80 and 82 being perforated for the reception of retaining pins 84.

Mounted on the angle portion 62 of the operating member and secured thereto by means of bolts 86 is a pawl housing 88. This housing 88 is provided with an annular portion 90 surrounding the ratchet wheel 74 and supported upon the annular portion of the operating member. A lip 91 on the annular portion 90 extends over the wheel 74 and serves to retain the sleeve 70 in position. A pawl 92 is slidably mounted within the housing 88 and urged into engagement with the ratchet wheel 74 by means of a spring 94 which abuts at its other end an adjusting screw 96 threaded into the end of the housing 88.

The pawl 92 may be disengaged from the ratchet wheel 74, for a purpose to be hereinafter described, by means of a plate 98 which is seated upon the annular portion 64 of the operating member beneath the ratchet wheel 74 and provided with an integral cam 100 projecting beyond the periphery of the ratchet wheel 74 and being thus adapted to disengage the pawl 92 therefrom. The plate 98 is furthermore provided with a depending arcuate flange 102 beneath the cam 100 provided with a plurality of apertures 104. A set screw 106 may be inserted through one of said apertures and be secured in a tapped hole 108 in the projection 68 of the collar 56 to secure the plate 98 in position. In this instance in Fig. 4, three such apertures 104 are shown and the screw 106 is inserted through the center one, but it will be apparent that any desired number of apertures may be employed and the screw inserted through any one of them so that the position of the cam 100 relative to the projection 68 may be adjusted as desired.

The operation of the device is as follows:

When the valve member 16 is in the full closed position shown in Fig. 1 one wall 67 of the operating member slot 66 will be spaced from the adjacent end 69 of the collar projection 68 as shown in Fig. 4 and the opposite wall of the slot 66 will abut the opposite end of the collar projection 68. The pawl 92 will then be in the dotted line position A (Fig. 4). Upon movement of the operating handle in the direction indicated by the arrow to open the valve, the wall 67 will move toward the adjacent end 69 of the collar projection. This is a period of lost motion or of independent rotation of the operating member. At the same time the pawl 92 will move toward the cam 100 and when the wall 67 and end 69 abut, the pawl will be in the dotted line position B on the cam and disengaged from the ratchet wheel. Further rotation of the operating member will initiate rotation of the valve member 16 in its seat by reason of the moving of the collar 56. When the operating member has moved 90° the stop 30 on the gland 28 will limit further rotation of the valve member which will then be in full open position with the slot 66 and projection 68 as shown in Fig. 5.

It will be apparent that during the foregoing opening movement of the valve member no lubricant has been transmitted from the reservoir to the valve seat. This feature of the invention can be best described by reverting for this purpose to the initial closed position of the valve (Fig. 4). It will be observed that before the pawl 92 rides upon the cam surface there is a brief period when it will slip over the ratchet teeth. This period can be lengthened or entirely eliminated by changing the position of the cam on the collar 56 by means of the apertures 104 and screw 106. If, during this period, the operating member is moved back to its starting point the pawl will move the ratchet wheel and the consequent movement of the sleeve 70 and its cap 76 will cause the compressor screw to force lubricant from the reservoir. This ratcheting movement can be continued at will without moving the valve member until a desired quantity of lubricant has been transmitted to the valve seat.

Provision is also made by this cam arrangement for transmitting a predetermined amount of lubricant from the reservoir to the valve seat before the valve is moved from open to closed position. As shown in Fig. 5 the gap which was between the wall 69 and adjacent end 67 in the closed position has been transferred to the opposite end of the slot 66 due to movement of the operating member relative to the collar 56. The pawl is still in position B (Fig. 4) relative to the cam which is now, however, 90° from the position in Fig. 4. When the operating handle is moved to close the valve the pawl will run off the cam surface and engage a tooth of the ratchet wheel. Further movement of the operating member will turn the wheel and therefore the compressor screw until the wall of the slot 66 engages the adjacent side of the projection 68, whereupon the valve member and compressor screw will rotate together. In this manner and by adjusting the position of the cam as described, a predetermined quantity of lubricant can be forced to the valve seat each time the operating member is actuated to close the valve.

This automatic lubricating feature has been arranged to occur before the valve is moved to closed position because in the majority of cases these valves are left open for long periods of time and require lubricating before they can be operated. However, it will be apparent that the automatic lubrication could be arranged to occur before the valve is moved to open position. All that would be necessary would be to form the ratchet teeth and the threads of the compressor screw and reservoir in a reverse direction to that shown in the drawing.

From the foregoing it will be apparent that all the objects and advantages of the invention have been accomplished. Lubrication can be effected by movement of the operating member and the device is readily applied to existing valves having the customary independent operating means and compressor screw. Various modifications may be made within the scope of the appended claims without departing from the spirit of the invention.

I claim:

1. The combination with a lubricated valve, comprising a casing having a valve seat, a valve member movable in said seat and having a lubricant reservoir communicating with said seat, of an operating member having connection with the valve member for transmitting movement thereto, said connection providing a period of lost motion therebetween, a lubricant compressor reciprocable in the reservoir for forcing lubricant therefrom to said seat, means movable relatively to said valve member during said period of lost motion, means carried by said operating member for actuating said movable means and a driving member carried by said movable means in operative engagement with said compressor and being disengageable therefrom to permit removal of said compressor from the reservoir.

2. The combination with a lubricated valve, comprising a casing having a valve seat, a valve member movable in said seat and having a lubricant reservoir communicating with said seat, of an operating member for the valve member, a lubricant compressor operatively connected to said reservoir for forcing lubricant therefrom to said seat, means for transmitting movement from said operating member to the valve member, said means providing a period of lost motion therebetween, means operable during said period for actuating said compressor by movement of the operating member and means for selectively rendering said compressor actuating means ineffective during the whole or a part of said period.

3. The combination with a lubricated valve, comprising a casing having a valve seat, a valve member movable in said seat and having a lubricant reservoir communicating with said seat, of an operating member having connection with the valve member for transmitting movement thereto, said connection providing a period of lost motion therebetween, a lubricant compressor reciprocable in the reservoir for forcing lubricant therefrom to said seat, means movable relatively to said valve member during said period of lost motion, means carried by said operating member for actuating said movable means and a driving member carried by said movable means externally of said reservoir in operative engagement with said compressor, said member being disengageable from the compressor to permit removal of said compressor from the reservoir.

4. In combination, a lubricated valve comprising a casing having a valve seat, a valve member movable in said seat, a projection on said valve member having a lubricant reservoir therein communicating with said seat, an operating member having connection with the valve member for transmitting movement thereto, said connection providing a period of lost motion therebetween, a lubricant compressor reciprocable in the reservoir for forcing lubricant therefrom to said seat, a ratchet carrying member journaled on the projection, pawl carrying means secured to the operating member for moving the ratchet carrying member relatively to said valve member during said period of lost motion, and a cap member carried by said ratchet carrying means surmounting said projection and having driving engagement with said compressor, said cap being disengageable from the compressor to permit removal of said compressor from the reservoir.

5. The combination with a lubricated valve, comprising a casing having a valve seat, a valve member movable in said seat and having a lubricant reservoir communicating with said seat, of an operating member for the valve member, a lubricant compressor operatively connected to said reservoir for forcing lubricant therefrom to said seat, a driven member secured to the valve member against relative rotation, a driving member extending from said operating member into operative relation with said driven member, said relation providing a period of lost motion therebetween, an actuating member engaging the compressor, means secured to said operating member and interengaging with said actuating member for actuating said compressor during said period, and means adapted to be interposed between said interengaging means and member for selectively rendering said compressor actuating means ineffective during the whole or a part of said period.

6. The combination with a lubricated valve, comprising a casing having a valve seat, a valve member movable in said seat, and having a lubricant reservoir communicating with said seat, of a hollow member secured to the valve member and forming an extension of said reservoir, a lubricant compressor movable within said hollow member for forcing lubricant therefrom to said seat, a sleeve rotatable on said hollow member and having driving engagement with said compressor, an operating member for said valve member, and means secured to said operating member and interengaging with said sleeve for actuating the compressor.

7. The combination with a lubricated valve, comprising a casing having a valve seat, a valve member movable in said seat, and having a lubricant reservoir communicating with said seat, of a hollow member secured to the valve member and forming an extension of said reservoir, a lubricant compressor movable within said hollow member for forcing lubricant therefrom to said seat, a sleeve rotatable on said hollow member and having driving engagement with said compressor, an operating member for said valve member, and ratchet and pawl mechanism associated with said operating member and sleeve for actuating the compressor.

8. The combination with a lubricated valve, comprising a casing having a fluid passageway therethrough and a valve seat, a valve member movable in said seat to control the flow of fluid through said passageway, a stem extending from said valve member and having a lubricant reservoir communicating with said seat, of a hollow member secured to the valve stem and forming an extension of said reservoir, a lubricant compressor movable within said hollow member for forcing lubricant therefrom to said seat, a sleeve rotatable on said hollow member and having driving engagement with said compressor, an operating member on the stem for moving the valve member from one position to another relative to said passageways, and ratchet and pawl mechanism associated with said operating member and sleeve for actuating the compressor.

9. The combination with a lubricated valve, comprising a casing having a fluid passageway therethrough and a valve seat, a valve member movable in said seat to control the flow of fluid through said passageway, a stem extending from said valve member and having a lubricant reservoir communicating with said seat, of a hollow member secured to the valve stem and forming an extension of said reservoir, a lubricant compressor movable within said hollow member for forcing lubricant therefrom to said seat, a sleeve rotatable on said hollow member and having ber and sleeve for actuating the compressor, and operating member on the stem for moving the valve member from one position to another relative to said passageways, ratchet and pawl mechanism associated with said operating member and sleeve for actuating the compressor, and means for selectively rendering said ratchet and pawl mechanism ineffective to actuate the compressor.

10. The combination with a lubricated valve, comprising a casing having a fluid passageway therethrough and a valve seat, a valve member movable in said seat to control the flow of fluid through said passageway, a stem extending from said valve member and having a lubricant reservoir communicating with said seat, of a hollow member secured to the valve stem and forming an extension of said reservoir, a lubricant compressor movable within said hollow member for forcing lubricant therefrom to said seat, a sleeve rotatable on said hollow member and having driving engagement with said compressor, a collar secured to the stem against relative rotation, a valve operating member having an annular slotted portion rotatably supported on said collar, a projection extending from said collar into said slotted portion and being engageable by the walls thereof, said projection being smaller than the slotted portion to provide for limited independent movement of the operating member, a ratchet wheel on the sleeve and a pawl carried by said operating member and engageable with said wheel.

11. The combination with a lubricated valve, comprising a casing having a fluid passageway therethrough and a valve seat, a valve member movable in said seat to control the flow of fluid through said passageway, a stem extending from said valve member and having a lubricant reservoir communicating with said seat, of a hollow member secured to the valve stem and forming an extension of said reservoir, a lubricant compressor movable within said hollow member for forcing lubricant therefrom to said seat, a sleeve rotatable on said hollow member and having driving engagement with said compressor, a collar secured to the stem against relative rotation, a valve operating member having an annular slotted portion rotatably supported on said collar, a projection extending from said collar into said slotted portion and being engageable by the walls thereof, said projection being smaller than the slotted portion to provide for limited independent movement of the operating member, a ratchet wheel on the sleeve, a pawl carried by said operating member and engageable with said wheel, and a cam adjustable on said collar to disengage the pawl when the operating member is moved a predetermined amount.

ARTHUR J. TROTT.